(12) United States Patent
Hancock

(10) Patent No.: US 8,226,052 B2
(45) Date of Patent: Jul. 24, 2012

(54) INSULATED CLAMP

(76) Inventor: Daniel J. Hancock, St. Louis, MO (US)

( * ) Notice: Subject to any disclaimer, the term of this patent is extended or adjusted under 35 U.S.C. 154(b) by 489 days.

(21) Appl. No.: 12/500,402

(22) Filed: Jul. 9, 2009

(65) Prior Publication Data

US 2011/0005044 A1   Jan. 13, 2011

(51) Int. Cl.
*F16L 3/08* (2006.01)
(52) U.S. Cl. .......................... 248/74.4; 248/61; 248/62
(58) Field of Classification Search .................. 248/56, 248/60–62, 74.1, 74.3, 74.4, 73
See application file for complete search history.

(56) References Cited

U.S. PATENT DOCUMENTS

| | | | | |
|---|---|---|---|---|
| 1,837,259 | A | * | 12/1931 | Fitzpatrick .................... 248/74.4 |
| 3,578,280 | A | | 5/1971 | Laughlin et al. |
| 4,323,088 | A | | 4/1982 | McClellan |
| 4,804,158 | A | | 2/1989 | Collins et al. |
| 5,233,881 | A | | 8/1993 | Sayen et al. |
| 5,947,425 | A | | 9/1999 | Gerster |
| 6,105,216 | A | * | 8/2000 | Opperthauser ................ 24/459 |
| 6,126,119 | A | | 10/2000 | Giangrasso |
| 6,131,859 | A | * | 10/2000 | Giuliano ........................ 248/62 |
| 6,173,926 | B1 | | 1/2001 | Elvegaard |
| 6,386,488 | B1 | * | 5/2002 | Menachem ................... 248/74.2 |
| 6,402,096 | B1 | | 6/2002 | Ismert et al. |
| 6,783,101 | B2 | | 8/2004 | Knotts |
| 7,387,281 | B2 | | 6/2008 | Nakamura |
| 2006/0027713 | A1 | * | 2/2006 | van Walraven ............... 248/56 |
| 2006/0249636 | A1 | | 11/2006 | Thiedig et al. |
| 2008/0296443 | A1 | | 12/2008 | Lunitz et al. |
| 2009/0065659 | A1 | | 3/2009 | Dann |
| 2010/0116947 | A1 | * | 5/2010 | Winkler ......................... 248/73 |

OTHER PUBLICATIONS

Armafix Insulation Pipe Hanger—Surer, Faster Solution for Supporting Pipes; Armacell Engineered Foams; Copyright by Armacell LLC (2008); www.armacell.com.
Klo-Shure(R) Insulation Coupling Specifications; Klo-Sure(R); Jul. 9, 2009; Copyright by Klo-Shure Corporation (2007); www.klo-shure.com/specs.php.
Klo-Shure(R) 7 Series Strut Mounted Part Numbers*; Klo-Sure(R); Jul. 9, 2009; Copyright by Klo-Shure Corporation (2007); www.klo-shure.com/strutmount7.php.
Klo-Shure(R) 8 Series Strut Mounted Part Numbers*; Klo-Sure(R); Jul. 9, 2009; Copyright by Klo-Shure Corporation (2007); www.klo-shure.com/strutmount8.php.

* cited by examiner

*Primary Examiner* — Gwendolyn Baxter
(74) *Attorney, Agent, or Firm* — Husch Blackwell LLP

(57) ABSTRACT

An insulated clamp for securing a pipe to a conventional C-channel including first and second portions each having a recess associated therewith for receiving a portion of a pipe to be positioned therebetween, the first portion including a pair of flanges receivable within the C-channel, an expansion device positioned between the pair of flanges for moving the flanges into engagement with the C-channel, and a coupling mechanism for attaching the first and second portions to each other. The coupling mechanism is engageable with the expansion device to move the pair of flanges into their engaged position with the C-channel when the first and second clamp portions are attached to each other.

19 Claims, 7 Drawing Sheets

INSULATED CLAMP

BACKGROUND OF THE INVENTION

The present invention relates to an insulated clamp and, more particularly, to an insulated clamp for use in securing a variety of different types of pipe such as domestic water pipes, heating hot water pipes, refrigeration pipes, and low temperature pipes to name a few to a conventional C-channel.

Prior art pipe hanging applications typically utilize a C-shaped metal channel ("C-channel") that is installed along the length of a ceiling or other ceiling type structure. The mechanical piping is laid across the C-channel and secured with metal clamps. Once attached to the C-channel, all pipe systems are typically insulated. This is to provide energy efficiency in the case of heating hot water pipes, or to prevent condensation in the case of refrigeration piping, low temperature piping, and some domestic water piping. After installation of the pipe and clamps, the portions of the pipe extending away from the C-channel on both opposite sides thereof are typically wrapped with insulation for energy efficiency and to prevent condensation from dripping onto ceiling tiles placed under the pipe.

Unfortunately, prior art clamps typically do not insulate that portion of the pipe to which the clamp is secured, that is, the clamp/pipe interface. Often, this portion of the pipe is left uninsulated or in some applications, as explained below, it is covered with a spray-type insulation, or with an insulation material that is merely inserted in the clamp/pipe interface area, which insulation compresses and/or becomes a less efficient insulator over time due to how it is installed in the interface area. Accordingly, condensation which develops in the clamp/pipe interface area can drip down onto the ceiling tiles.

There are several prior art methods that utilize "hangers" or "hanger sections" to secure the pipe to the C-channel and insulate this area of the pipe. Typically, a clamp is used to secure the un-insulated portion of the pipe directly against the C-channel. This un-insulated section of pipe is then covered with a piece of insulated material, for example, an Armaflex® insulation pipe hanger. This piece of insulation is then glued to the insulation associated with the pipe on either side of the clamp. However, in this prior art method, the underneath side of the pipe attached to the C-channel remains un-insulated. As such, in the case of low temperature piping, a spray foam insulation may be used to insulate the underneath side of the pipe. This solution is time consuming and does not always completely cover the underneath side of the pipe nor does it always prevent condensation. Specifically, Armaflex® insulation will compress over time, thereby causing gaps in the insulation and/or allowing movement of the pipe within the clamp.

Other prior art methods, such as the method shown in FIG. 1, utilize an insulated sleeve section 10 that encases the pipe 12 under the clamp 14 which is then secured to the C-channel with a typical clamp. Alternatively, a short piece of pipe insulation may be wrapped around the pipe in the clamp area and sealed with a self-seal adhesive type tape. The ends of the insulation are then glued to the insulation 16 surrounding the unclamped portions of the pipe. Such solutions may provide insulation, however the amount of insulation is typically limited. Specifically, the insulation must be sized to fit within the clamp. As such, the insulation at the clamped portion of the pipe is generally minimal in comparison to the un-clamped portion of the pipe, thereby decreasing the efficiency of the insulation. Also, the insulated sleeves are typically subject to compression, causing gaps and/or allowing movement of the pipe. Moreover, these known methods require addition supplies, thereby resulting in additional costs and time required to install and insulate the pipe.

SUMMARY OF THE INVENTION

The present invention is directed to an insulated clamp for use with commercial pipes, in particular, heating and cooling pipes or any other pipe that may sweat and/or accumulate condensation. The clamp is made from a flexible solid piece of material, such as a high density rubber, capable of insulating a pipe and it provides insulation for a pipe at the interface area where it is secured to the C-channel. The clamp includes a first portion configured to attach to a C-channel and a second portion that fixedly secures to the first portion to enclose a portion of the pipe within the first and second portions of the clamp. Both the first portion and the second portion include a recess configured to mate with and fit around the curvature of a pipe and secure the pipe therebetween.

The first portion further includes a pair of flanges configured to be positioned within the C-channel. A rod member or other similar device is positioned between the two flanges and is capable of movement therebetween. At least one fastening member such as a threaded screw is used to secure the second portion to the first portion. The fastening members extend through the rod member positioned in the first portion.

During installation, the flanges of the first portion are positioned within the C-channel and the pipe to be secured is positioned within the recess of the first portion. The second portion of the clamp is then placed over the pipe so that the pipe is sandwiched between the recesses of the first and second portions of the clamp. The first and second portions of the clamp are positioned in contact with one another so that the pipe is insulated on all sides by the clamp. The fastening members are then used to secure the two clamp portions together. Specifically, each clamp portion includes an aperture to receive each fastening member. The apertures of each clamp portion are aligned, and are further aligned with apertures formed in the rod member located between the flanges associated with the first portion. As the fastening members are tightened, the rod member is drawn toward the pipe causing the flanges of the first portion to move or flare outward away from each other thereby allowing the flanges of the first portion to come into contact with a respective lip, edge or side portion associated with the C-channel.

Accordingly, the present clamp provides insulation at the pipe/clamp interface thereby providing a fully insulated seal around the pipe. In addition, because it is made of a solid, high density flexible material, it is sturdy in that there is no compression or loss of functionality over time. The remaining exposed portion of the pipe is then insulated using known methods to provide insulation along the entire length of the pipe. As such, condensation is prevented from accumulating around any portion of the pipe. Moreover, the present clamp reduces time and money associated with securing pipes to a C-channel. Although the present invention is described with respect to securing a pipe to a C-channel, as will be appreciated by one of ordinary skill in the art, the present invention may be modified to secure other structures.

Further areas of applicability of the present invention will become apparent from the detailed description provided hereinafter. It should be understood that the detailed description and specific examples set forth herein, while indicating particular embodiments of the invention, are intended for purposes of illustration only and are not intended to limit the scope of the invention.

BRIEF DESCRIPTION OF THE DRAWINGS

For a better understanding of the present invention, reference may be made to the detailed description and the accompanying drawings.

DETAILED DESCRIPTION

The following description of the various embodiment(s) of the present invention is merely exemplary in nature and is in no way intended to limit the invention, its application, or uses.

FIGS. 2-5 illustrate one embodiment of an insulated clamp device 20 constructed in accordance with the teachings of the present invention. FIGS. 6-9 illustrate a second embodiment of the present clamp device 20'. Unless otherwise indicated, the first and second embodiments are substantially the same and like parts are referenced using the same reference numbers.

Figure 1:
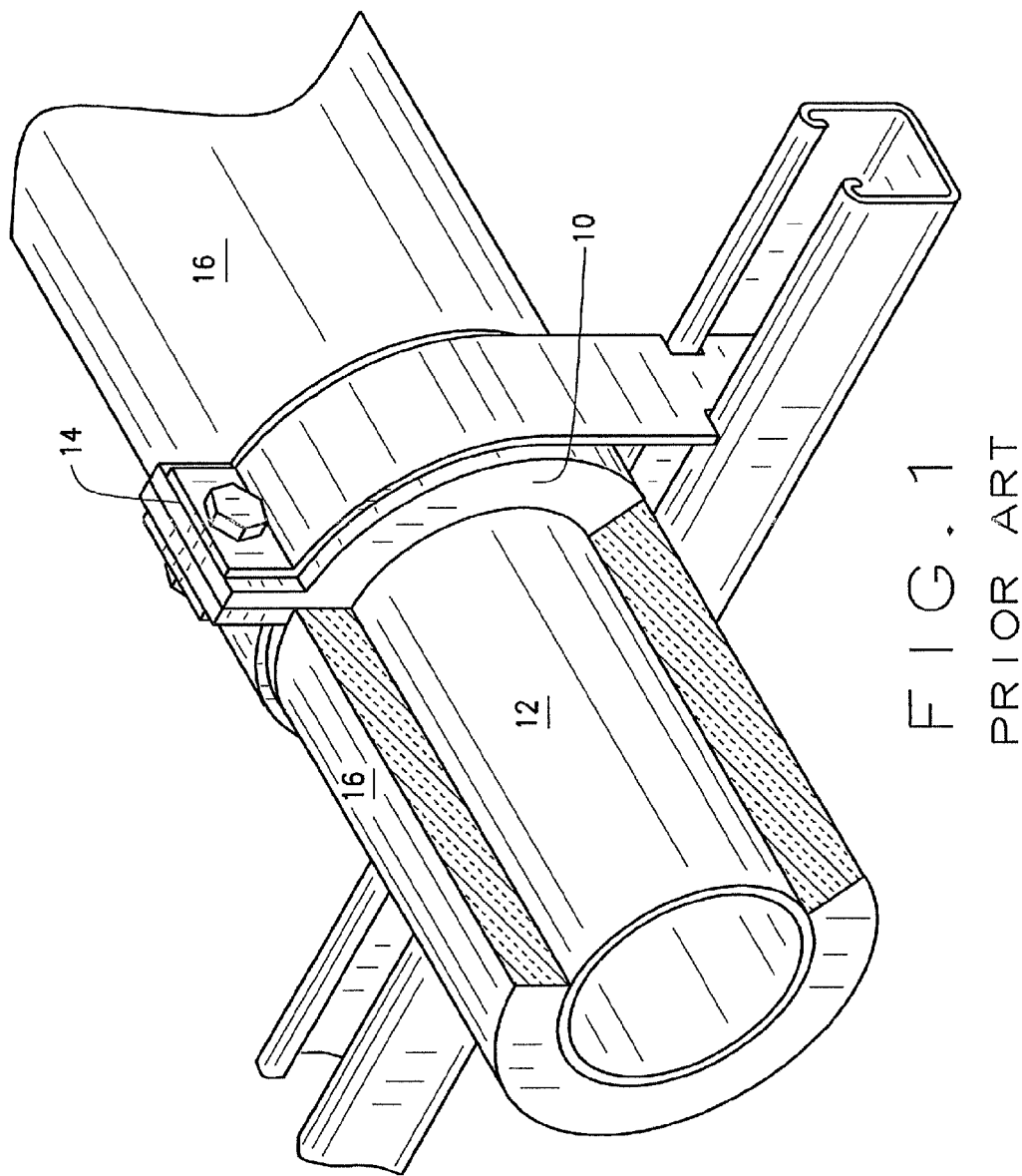
FIG. 1 is a perspective view of a prior art method of installing pipe.
Figure 2:
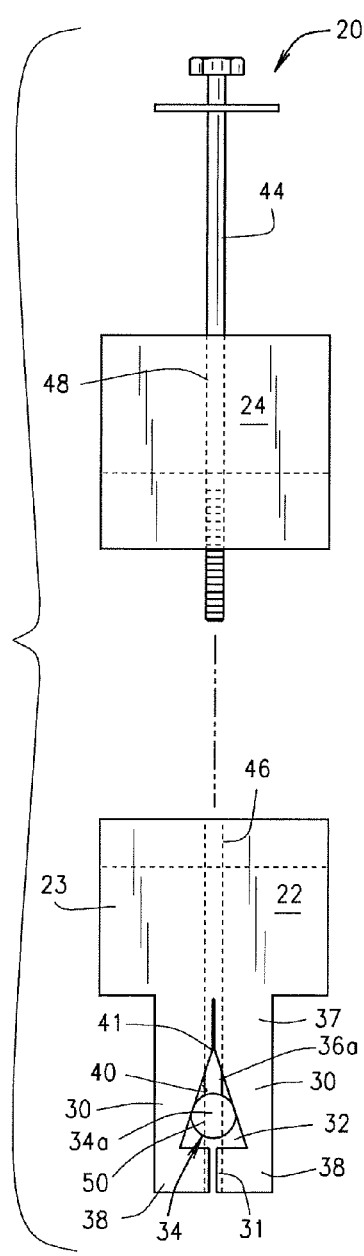
FIG. 2 is an exploded side elevational view of one embodiment of the present clamp device constructed in accordance with the teachings of the present invention.
Figure 3:
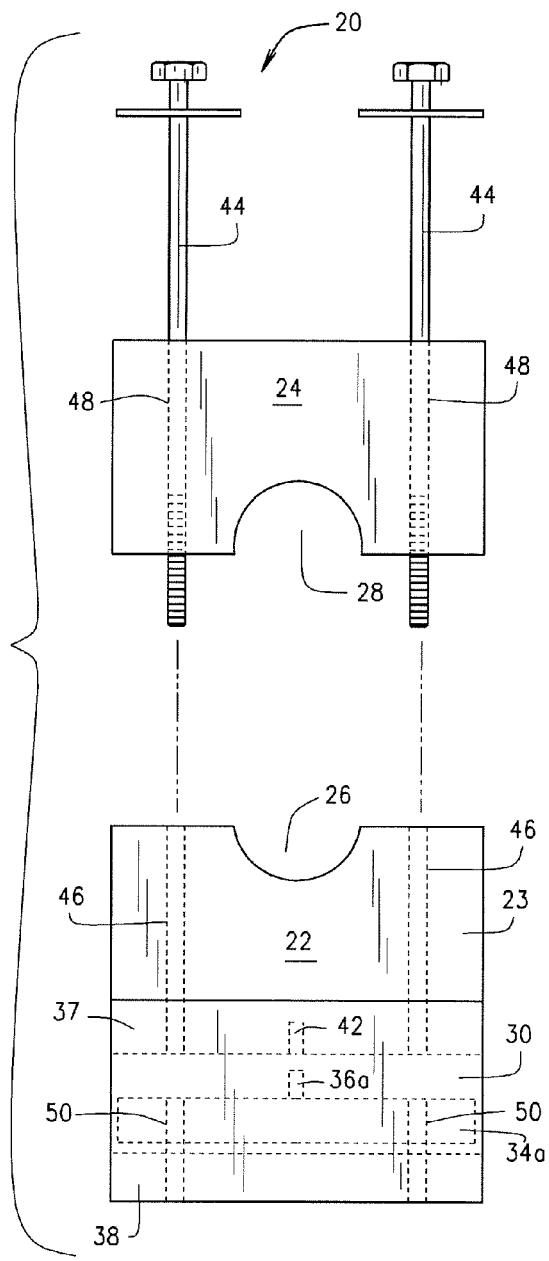
FIG. 3 is an exploded front elevational view of the clamp device illustrated in FIG. 2.
Figure 4:
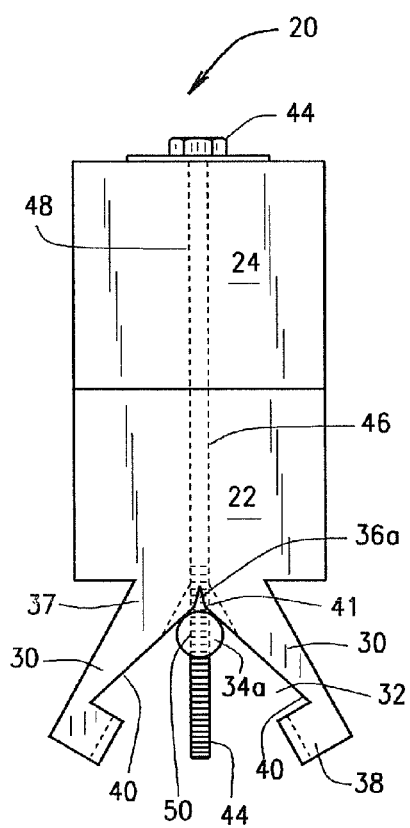
FIG. 4 is a side elevational view of the clamp device illustrated in FIGS. 2 and 3 in its assembled position.
Figure 5:
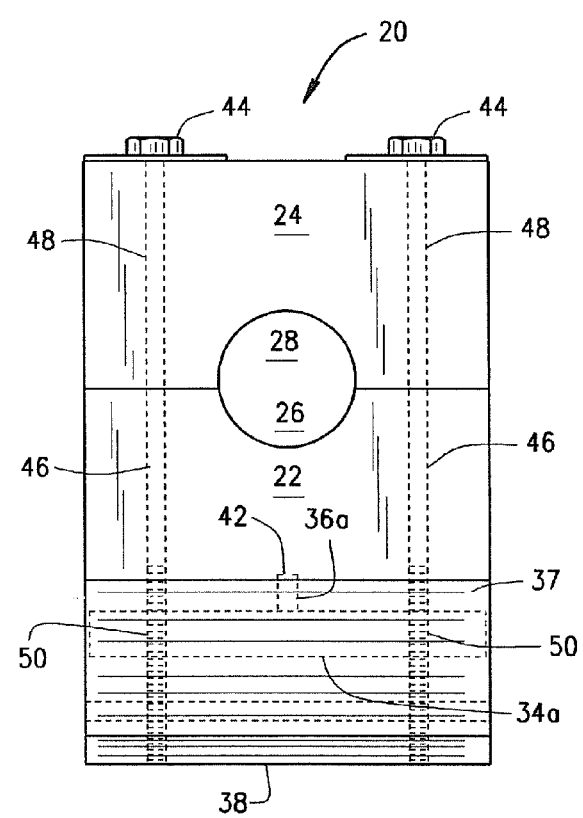
FIG. 5 is a front elevational view of the clamp device illustrated in FIGS. 2 and 3 in its assembled position.

Clamp 20 in FIGS. 2-5 includes a first portion 22 and a second portion 24, each formed from an insulating material such as, but not limited to, a high density rubber material. First portion 22 and second portion 24 are configured to mate and couple together so that a pipe may be securely held therebetween. Specifically, first portion 22 and second portion 24 each include a recess 26 and 28 respectively, the recesses being positioned and located on their respective portions to align and lie in registration with each other when first portion 22 and second portion 24 are coupled together and placed in their assembled position. Recesses 26 and 28 are sized and shaped respectively to cooperatively fit around a particular size pipe. Accordingly, when fabricating the first and second portions 22 and 24, the recesses 26 and 28 are appropriately sized to fit around a sized pipe depending upon the intended application. In particular, the recesses 26 and 28 are sized to provide a close fit in contact with the outer circumference of the pipe when first and second portions 22 and 24 are positioned therearound and coupled together as will be hereinafter further explained. As such, because of the insulating material of which the clamp 20 is made, the present clamp 20 provides an insulated seal around the circumference of the pipe when tightly coupled thereto. In this regard, although the recesses 26 and 28 can be substantially semi-circular in shape, they can be of different arcuate lengths or circumference as illustrated in FIG. 3 wherein recess 26 has a shorter circumference as compared to recess 28. However, when the recesses 26 and 28 are positioned in their mating and assembled position as illustrated in FIG. 5, the recesses 26 and 28 form a complete circle sufficient to tightly circumscribe and encapsulate the pipe positioned therebetween.

First portion 22 also includes a pair of flanges 30 that extend from the main body portion 23 of first portion 22 as best illustrated in FIGS. 2 and 3. The flanges 30 are narrower in width or depth as compared to main body portion 23 as best illustrated in FIG. 2 so that they can easily fit and slide into the C-channel for engagement therewith as will be hereinafter explained. The flanges 30 are separated by a slot 31 that extends between the flanges 30 as best illustrated in FIG. 2 and communicates with triangularly shaped opening 32 formed by and between the flanges 30 and which likewise extends substantially the full length between the flanges 30. An expansion mechanism 34 is positioned within opening 32 and extends along at least a portion of the length of first portion 22. In the embodiment illustrated in FIGS. 2-5, expansion mechanism 34 is shown as a cylindrical rod member 34a. Rod member 34a is positioned as illustrated in FIG. 2 against the tapered walls 40 of opening 32 and includes a pin member 36a that extends toward the recess 26. The pin member 36a is frictionally held between the portion 37 of the flanges 30 as best illustrated in FIG. 2 to prevent the rod member 34a from rotating within the opening 32. In the embodiment illustrated in FIGS. 6-9, expansion mechanism 34 is shown as a hemispherical rod member 34b. Hemispherical rod member 34b likewise includes a pin member 36b that extends away from the recess 26 and is frictionally held between the portion 38 of the respective flanges 30, or it can be held and received within the opening or cavity 42' formed in the portion 38 of flanges 30 to prevent the member 34b from rotating within opening 32. While expansion mechanism 34 is described with respect to a cylindrical or hemispherical rod member, as will be appreciated by one of ordinary skill in the art, expansion mechanism 34 may be configured in any suitable shape in accordance with the teachings of the present invention.

Expansion mechanism 34 is configured to be drawn through opening 32 toward recess 26 to expand the respective flanges 30 outward. The mechanism utilized to draw expansion mechanism 34 through opening 32 is described in more detail below. Opening 32 is formed with angled or tapered walls 40 that converge at end portion 41 of opening 32 proximate to recess 26. Accordingly, as expansion mechanism 34 is drawn upward, expansion mechanism 34 pushes against the walls 40 thereby pushing the flanges 30 apart causing the respective flanges 30 to move or expand outward away from each other. In the embodiment illustrated in FIGS. 2-5, an opening 42 is formed in the portion 37 of the flanges 30. The opening 42 is configured to receive pin member 36a as expansion mechanism 34 is drawn through opening 32. Once pin member 36a is received within opening 42, the expansion mechanism 34 is further secured in its final position.

Figure 8:
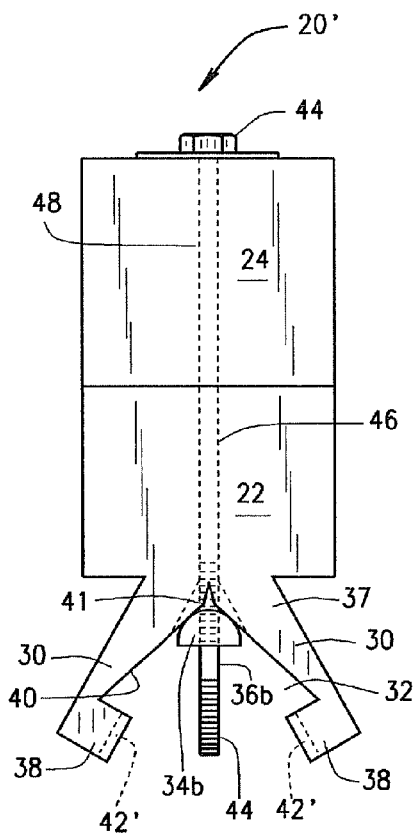
FIG. 8 is a side elevational view of the clamp device illustrated in FIGS. 6 and 7 in its assembled position.

Clamp 20 also includes a coupling or attachment mechanism 44 configured to secure second portion 24 to first portion 22. In the exemplary embodiments, coupling or attachment mechanism 44 includes a pair of threaded fastening members configured to be received through apertures formed in the first and second portions 22 and 24. More particularly, first portion 22 includes apertures 46 that align with corresponding apertures 48 formed in second portion 24. Apertures 50 are also formed through expansion mechanism 34 and are likewise configured to align with apertures 46 and 48. In this regard, pin member 36a prevents expansion mechanism 34 from rotating as previously explained so that the apertures 50 stay aligned with and in communication with the apertures 46 and 48 when the mechanism 34 is initially positioned within opening 32. Coupling mechanism 44 is configured to be received through the respective apertures 46, 48, and 50 so that the first portion 22 can be tightly secured to the second portion 24. In this regard, at least the apertures 50 are threaded such that as the threaded fastening members 44 are threaded through the openings 50, coupling mechanism 44 operates to draw the expansion mechanism 34 through opening 32 towards the recess 26 as described above thereby both pulling the first portion 22 into tight engagement with the second portion 24 and also moving the flanges 30 outwardly away from each other as illustrated in FIGS. 4 and 8. As such, coupling mechanism 44 both tightly secures the first and second portions 22 and 24 of clamp 20 and engages expansion mechanism 34 to flare the respective flanges 30 outwardly. It is also recognized and anticipated that apertures 46 and/or 48 could likewise be threaded to further ensure a tight engagement between the first and second portions 22 and 24.

Figure 10:
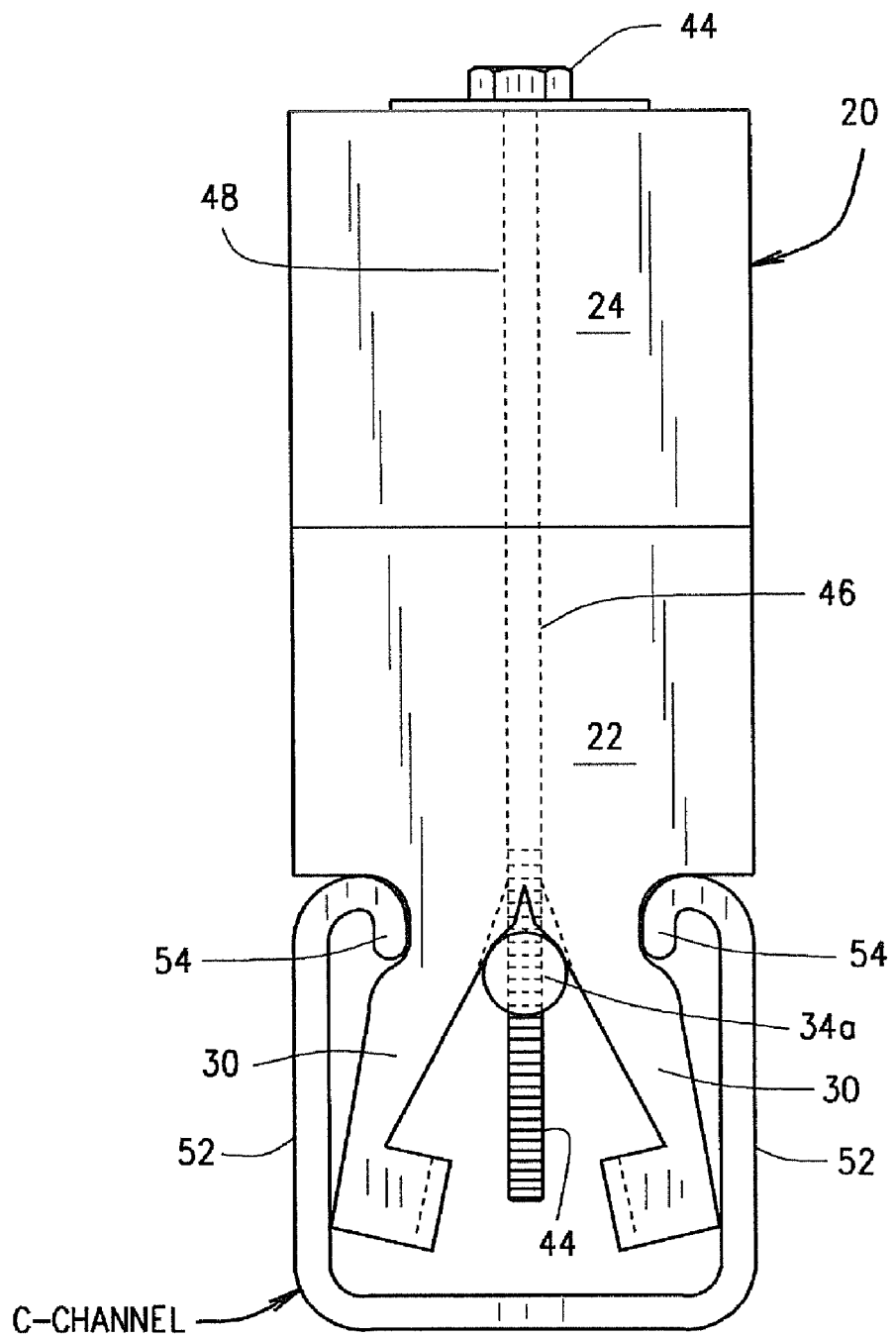
FIG. 10 is a side elevational view showing the clamp device of FIGS. 2-5 engaged with a conventional C-channel.

During operation, the present clamp 20 is utilized to hang pipe from a C-channel. As will be appreciated by one of ordinary skill in the art, clamp 20 may be configured for other suitable applications. Flanges 30 of first portion 22 are positioned within the C-channel so that recess 26 is accessible. The pipe is then positioned within recess 26 and the second portion 24 of clamp 20 is positioned over the pipe so that that the pipe is positioned and encased securely within and between the recesses 26 and 28 of first and second portions 22 and 24 respectively. With the pipe positioned between recesses 26 and 28, second portion 24 is in abutting contact with first portion 22 so that apertures 46 and 48 are aligned as illustrated in FIG. 10.

Coupling or attachment mechanism 44 is then utilized to tightly secure the second portion 24 to the first portion 22. Specifically, the threaded fastening members 44 are inserted through apertures 46 and 48 and brought into contact with the apertures 50 of expansion mechanism 34. In the exemplary embodiments illustrated herein, since the apertures 50 are threaded, the fastening members 44 can be threadedly engaged with the apertures 50 and threaded therethrough. As coupling mechanism 44 is threaded into apertures 50, expansion mechanism 34 is drawn through opening 32 toward the pipe. As the rod or hemispherical member 34a or 34b is moved, expansion mechanism 34 pushes against the angular walls 40 of opening 32 thereby causing each respective flange 30 to flare outwardly into contact with the walls 52 and/or a lip portion 54 of a conventional C-channel such as the C-channel illustrated in FIG. 10. As the flanges 30 move into contact with portions 52 and/or 54 of the C-channel, the first portion 22 of clamp 20 is wedged and frictionally held within the C-channel as illustrated in FIG. 10. Accordingly, coupling mechanism 44 secures the clamp 20 to the pipe, while simultaneously securing the clamp 20 to the C-channel. When secured, the clamp 20 provides insulation around the entire circumference of the pipe at the pipe/C-channel interface thereby eliminating the need for spray foams and/or compressible insulating sleeves. Still further, when coupling mechanism 44 is removed from clamp 20, the flanges 30 retract inward back towards each other and towards their initial non-expanded state thereby allowing clamp 20 to be easily removed from the C-channel.

Figure 6:
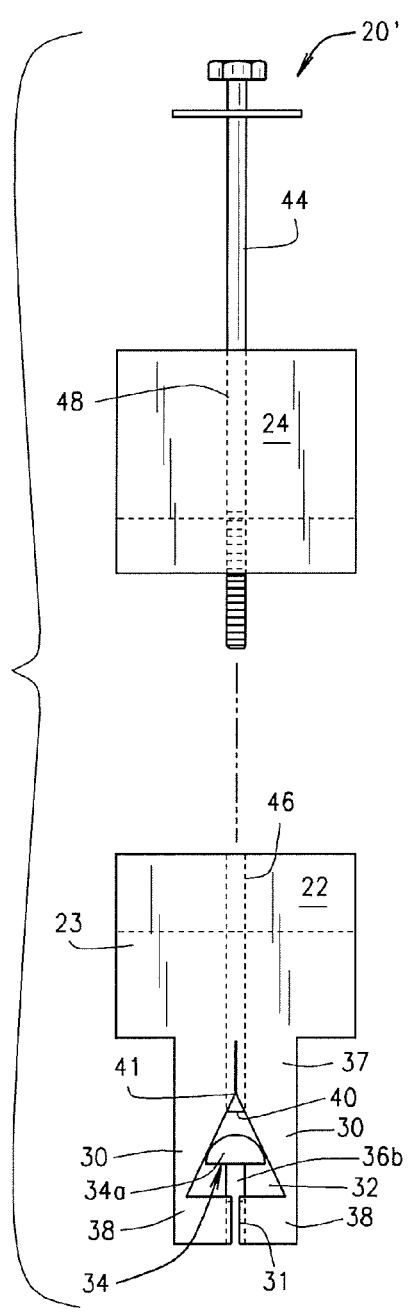
FIG. 6 is an exploded side elevational view of a second embodiment of the present clamp device constructed in accordance with the teachings of the present invention.
Figure 7:
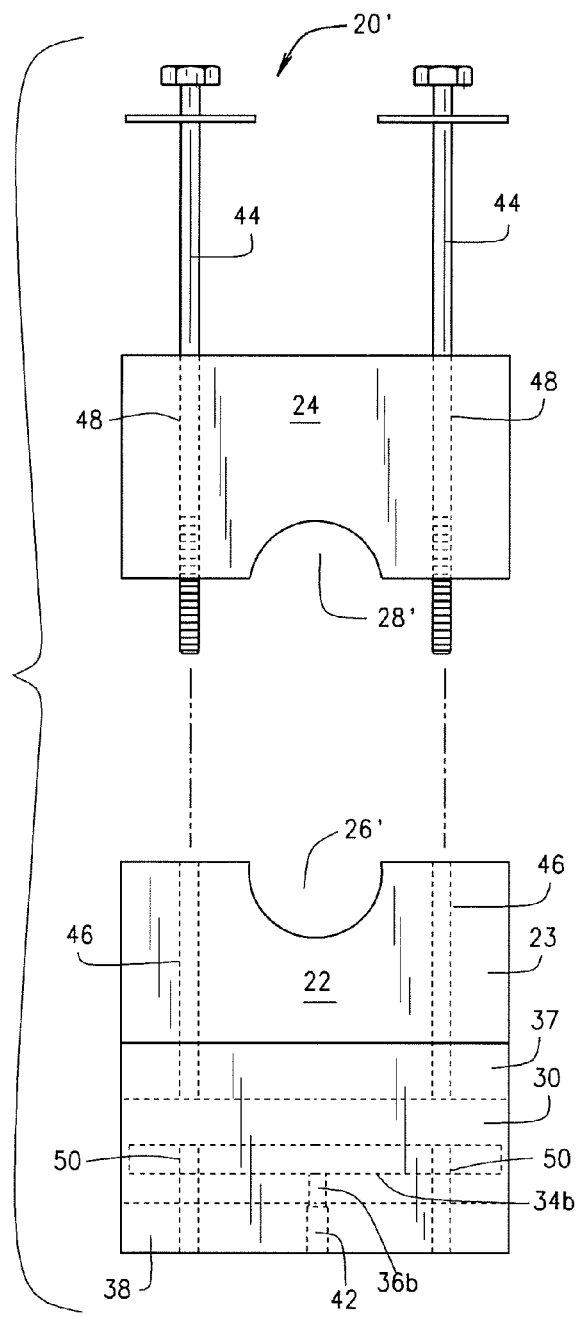
FIG. 7 is an exploded front elevational view of the clamp device illustrated in FIG. 6.

As discussed above, FIGS. 6-9 illustrated another embodiment 20' of the present clamp device, the clamp device 20' being substantially similar in construction and operation to the clamp device 20 illustrated in FIGS. 2-5 except for use of the hemispherical rod member 34b as the expansion mechanism 34. In all other respects, the construction and operation of the first and second clamp portions 22 and 24, the flange portions 30, the opening 32, the apertures 46, 48 and 50 and the fastening members 44 associated with clamp device 20' are substantially identical to the construction and operation of the corresponding members associated with clamp device 20 (FIGS. 2-5). The differences between clamp device 20' and clamp device 20 lie in the construction of the expansion mechanism rod member 34b, the positioning and orientation of the pin member 36b and the positioning and location of the corresponding opening 42', and the arcuate circumferences associated with recesses 26' and 28'. In this regard, the hemispherical rod member 34b functions and operates substantially similar to the cylindrical rod member 34a and is positioned and located as illustrated in FIG. 6 against the tapered wall 40 of the opening 32. Like rod member 34a, rod member 34b likewise includes a pin member 36b which extends away from the recess 26' and the pin member 36b is long enough to extend into and to be received by the opening or cavity 42' formed in the portion 38 of flanges 30 as best illustrated in FIG. 7. In this embodiment, pin member 36b is engaged with the opening or cavity 42' in order to further prevent the rod member 34b from rotating within the opening 32 since pin member 36b extends away from the tapered walls 40 of the opening 32. In all other respects, the hemispherical rod member 34b functions substantially identical to the cylindrical rod member 34a as previously explained.

Figure 9:
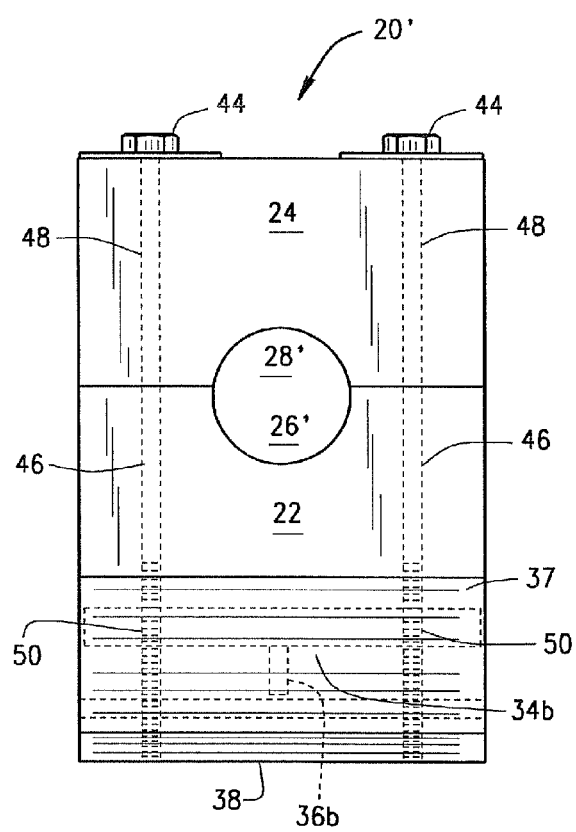
FIG. 9 is a front elevational view of the clamp device illustrated in FIGS. 6 and 7 in its assembled position.

Still further, the rod member 36b likewise includes at least one threaded opening 50, and preferably two threaded openings 50, for receiving the threaded fastening members 44 as previously explained. Threading the fastening members 44 through the threaded apertures 50 likewise pulls or draws the rod member 34b through the opening 32 towards the recess 26' thereby securely attaching and fastening the first portion 22 into tight engagement with the second portion 24 of the clamp device 20' and it also moves and expands the flange portions 30 outwardly away from each other into engagement with the C-channel as previously explained. In addition, the arcuate length or circumference of the respective recesses 26' and 28' as best illustrated in FIG. 7 are reversed as compared to the recesses 26 and 28 illustrated in FIG. 3. In this regard, recess 26' has a greater arcuate length or circumference as compared to recess 28'. Nevertheless, like recesses 26 and 28, when the recesses 26' and 28' are positioned in their mating and assembled position as illustrated in FIG. 9, the recesses 26' and 28' likewise form a complete circle sufficient to tightly circumscribe and encapsulate a pipe positioned therebetween.

Figure 11:
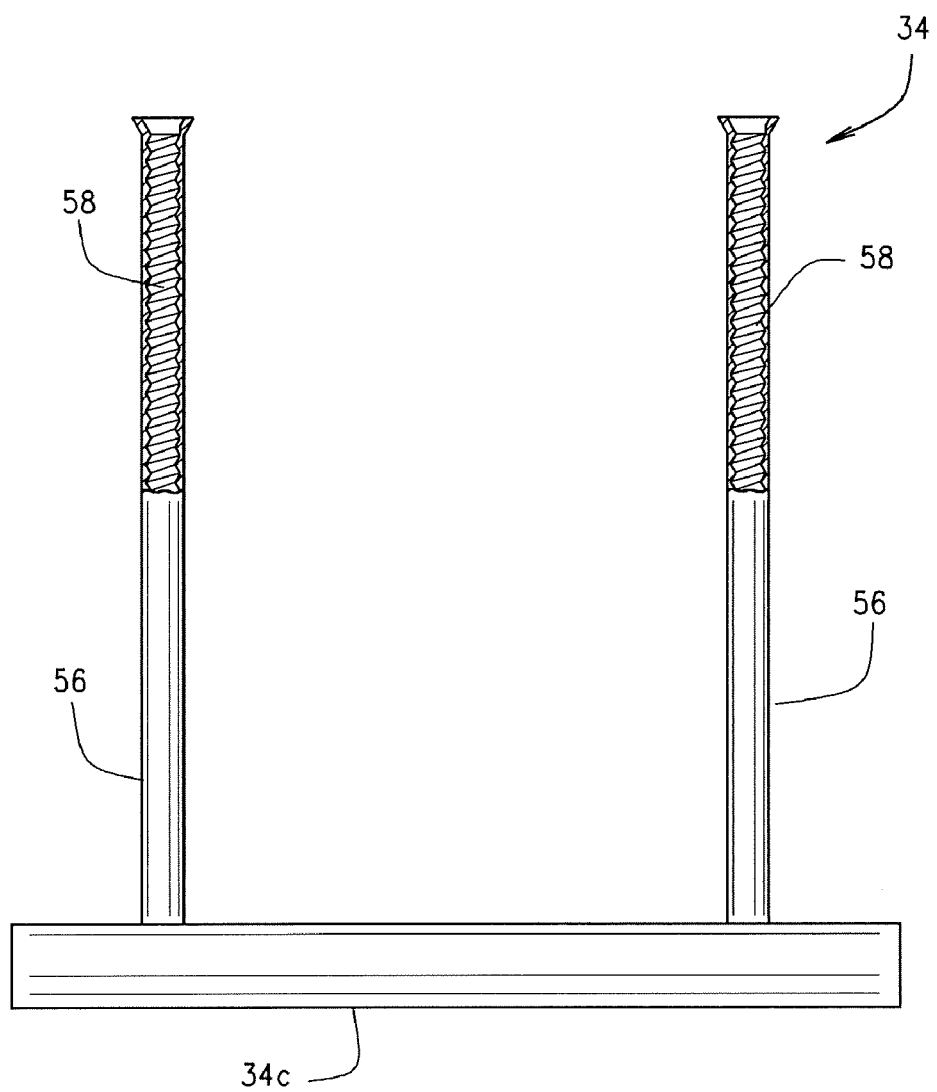
FIG. 11 is a front partial cut-away elevational view of another embodiment of the expansion mechanism used in the present clamp device.

FIG. 11 discloses still another embodiment of the expansion mechanism 34 which includes a cylindrical rod member 34c and a pair of tubular numbers 56 extending substantially perpendicular thereto as best illustrated in FIG. 11. Tubular members 56 include internal threads 58, such threads extending at least partially along the length of each respective tubular member 56. The tubular members 56 are positioned along the length of the rod member 34c so as to lie in registration with and so as to be insertable within at least the apertures 46 associated with first portion 22 and, preferably, also within the apertures 48 associated with second portion 24 of the clamp 20. The threaded fastening members 44 are configured and dimensioned to engage the tubular members 56 and likewise draw the rod member 34c through opening 32 as previously described. Since the tubular members 56 are initially positioned and inserted within at least the apertures 46 associated with first portion 22, the previously described pin members 36a and 36b are no longer needed since the tubular members 56 serve to prevent rod member 34c from rotating within the opening 32. Also, to be fully operational, the tubular members 56 need only extend at least partially into the apertures 46 associated with first portion 22. Tubular members 56 may likewise extend completely through apertures 46 and at least partially through apertures 48 associated with second portion 24 to further ensure a tight engagement and joinder between first and second portions 22 and 24. Also, as previously noted, the interior portion of each respective tubular member 56 can be partially or fully threaded along its respective length depending upon the length of each respective tubular member 56 as well as the length of each respective threaded fastening member 44. Still further, fastening members 44, in this particular embodiment, need not extend through rod member 34c as is true with rod members 34a and 34b, although such an arrangement is likewise possible and would only require extending apertures through rod member 34c in alignment with the interior diameter of each respective tubular member 56. In all other respects, the rod member 34c functions and operates substantially similar to rod member 34a and hemispherical rod member 34b as previously explained to both pull the first portion 22 into tight engagement with the second portion 24 and to also move the flanges 30 outwardly away from each other into engagement with the C-channel. Rod member 34c is likewise not limited to a cylindrical or hemispherical shape but can likewise be configured to take on any suitable shape.

It is also recognized and anticipated that a wide variety of differently shaped openings 32 and differently shaped expansion mechanisms 34 could be utilized to move and expand the flanges 30 outwardly into engagement with a conventional C-channel when the coupling mechanism 44 is engaged and threaded through the respective apertures or tubular members as previously explained. It is also recognized and anticipated that other coupling mechanisms 44 and expansion mechanisms 34 could be utilized to achieve the same result, namely, attaching the clamp portions 22 and 24 together and moving the flange portions 30 into engagement with the C-channel It is also recognized that the size and shape, including the arcuate length or circumference of the respective corresponding recesses 26, 26', 28 and 28' can likewise vary so long as the recesses 26, 26', 28 and 28' form a substantially complete circle which fully circumscribes and encapsulates a pipe positioned therebetween when the first and second portions 22 and 24 of the present clamp 20 or 20' are engaged and secured in their assembled position. It is likewise recognized that a wide variety of different types of flexible insulating materials besides rubber could be utilized to fabricate the first and second portions 22 and 24 of the present clamp device so long as the insulating material meets the required insulating criteria for the particular application involved such as retaining heat when used in a hot water pipe application, and preventing condensation when used in a low temperature or refrigeration pipe application.

The present insulated clamp device for securely attaching a pipe to a conventional C-channel provides a two-fold function, namely, it functions both as a clamp for attaching a particular pipe to a conventional C-channel and it likewise acts as the insulation for the pipe in the clamp/C-channel interface area, all in one product. The present clamp device can be installed at the time of the pipe installation without coordination with the installing of the insulation and without requiring additional time and/or costs to insulate the pipe/clamp interface. In this regard, the present clamp device is a single unit that can be fully installed with the pipe and after the pipe and clamp are employed and attached to the C-channel, the remaining portion of the pipe extending from both opposite sides of the present clamp device can be insulated in a conventional manner, such as gluing or otherwise attaching insulation such as Armaflex® insulation, to the opposed opposite sides of the present clamp device. This process completes the vapor seal between the clamp/C-channel interface and the insulation material is formed around the remaining portions of the pipe between adjacent clamp members in order to eliminate condensation. There is likewise no risk of compression due to the type of insulating material used such as a high density rubber material and, as a result, the present clamp device does not compress over time, thus maintaining the integrity of the pipe installation. The total labor involved with this application including installing the present clamp devices around a particular pipe and attaching the same to a conventional C-channel is less than other applications presently being used thus providing a more economical solution to this problem. Since the rubber or other insulating material used to fabricate the first and second portions 22, 22', 24 and 24' provides insulation for the pipe encapsulated therebetween, no additional insulation is needed in the hanger or interface area. Additionally, the present invention is removable from the C-channel to allow more flexibility in the pipe installation/repair/replacement process.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A clamp for securing a pipe to a C-channel comprising:
a first portion and a second portion, said first and second portions being attachable to each other and being configured to secure the pipe therebetween;
a pair of flange portions extending from said first portion and receivable within the C-channel, said flange portions being movable relative to each other;
an expansion mechanism positioned between said pair of flange portions, said expansion mechanism moving said flange portions into engagement with the C-channel when said first and second portions are attached to each other; and
a coupling mechanism to attached said second portion to said first portion, said coupling mechanism engaging said expansion mechanism to move said pair of flange portions into engagement with the C-channel when said second portion is attached to said first portion.

2. The clamp according to claim 1 wherein said expansion mechanism includes a rod member.

3. The clamp according to claim 2 wherein said rod member includes a pin member to prevent rotation of said rod member.

4. The clamp according to claim 2 wherein said rod member includes a pair of tubular members extending substantially perpendicular to the longitudinal axis of said rod member.

5. The clamp according to claim 1 wherein said coupling mechanism includes at least one threaded fastening member, and wherein said expansion mechanism includes at least one threaded aperture, said at least one fastening member engaging said at least one aperture.

6. The clamp according to claim 1 wherein said coupling mechanism includes at least one threaded fastening member, and wherein said expansion mechanism includes at least one partially threaded tubular member, said at least one fastening member engaging said at least one tubular member.

7. The clamp according to claim 1 wherein said flange portions move out of engagement with the C-channel when said coupling mechanism is disengaged from said expansion mechanism.

8. The clamp according to claim 1 wherein said first and said second portions are each made of an insulating material.

9. The clamp according to claim 1 wherein said first and said second portions each include a recess sized to fit around a portion of the pipe when the pipe is positioned between said first and second portions, said recesses substantially surrounding the pipe when positioned therebetween.

10. An insulated clamp for securing a pipe to a C-channel comprising:
a first portion having a first recess associated therewith for receiving a portion of the pipe positioned therein, said first portion including a pair of flange portions movable relative to each other, said flange portions being receivable within the C-channel;
a second portion having a second recess associated therewith for receiving a portion of the pipe positioned therein, said second portion being attachable to said first portion;
said first and second portions being formed from an insulating material and substantially encapsulating the pipe positioned within said first and second recesses when said first and second portions are attached to each other;
an expansion mechanism positioned between said pair of flanges for moving said flanges into engagement with the C-channel when said first and second portions are attached to each other and said pair of flanges are received within the C-channel; and
an attachment mechanism for attaching said first and second portions to each other, said attachment mechanism being engageable with said expansion mechanism and moving said pair of flanges into engagement with the C-channel when said first and second portions are attached to each other.

11. The insulated clamp according to claim 10 wherein said attachment mechanism includes at least one threaded fastening member positionable within corresponding apertures extending through said first and second portions.

12. The insulated clamp according to claim 11 wherein said expansion mechanism includes at least one threaded aperture, said at least one fastening member engaging said at least one threaded aperture associated with said expansion mechanism for moving the expansion mechanism between said pair of flanges, movement of said expansion mechanism moving said flanges into engagement with the C-channel.

13. The insulated clamp according to claim 11 wherein said expansion mechanism includes at least one partially threaded tubular member, said at least one fastening member engaging said at least one tubular member associated with said expansion mechanism for moving the expansion mechanism between said pair of flanges, movement of said expansion mechanism moving said flanges into engagement with the C-channel.

14. The insulated clamp according to claim 10 wherein said expansion mechanism includes a pin member to prevent rotation of said expansion mechanism when positioned between said pair of flanges.

15. The insulated clamp according to claim 10 wherein said expansion mechanism includes a pair of tubular members engageable with said attachment mechanism.

16. A method of securing a pipe to a C-channel comprising the following steps:
providing a clamp having a first portion and a second portion, said first portion having a pair of flanges associated therewith;
positioning said pair of flanges within the C-channel;
positioning the pipe on the first portion of said clamp;
positioning said second portion of said clamp on top of the pipe and in mating relationship with said first portion;
providing an expansion mechanism between the pair of flanges; and
providing a coupling mechanism for securing said second portion to said first portion to secure the pipe therebetween, said coupling mechanism engaging said expansion mechanism and said expansion mechanism moving said pair of flanges into engagement with the C-channel when the second portion is secured to the first portion.

17. The method according to claim 16 further including incorporating a recess into each of said first and second portions, said recesses being configured to receive the pipe when positioned between said first and second portions.

18. The method according to claim 16 including forming said first and second portions from an insulating material.

19. A clamp for securing a pipe to a C-channel comprising:
a first portion and a second portion, said first and second portions being attachable to each other and being configured to secure a pipe therebetween;
a pair of flange portions extending from said first portion and receivable within the C-channel, said flange portions being movable relative to each other; and
an expansion mechanism positioned between said pair of flange portions, said expansion mechanism moving said flange portions into engagement with the C-channel when said first and second portions are attached to each other, said expansion mechanism including a rod member, said rod member including a pair of tubular members extending substantially perpendicular to the longitudinal axis of said rod member.

* * * * *